United States Patent
Bindra

[11] Patent Number: 5,997,628
[45] Date of Patent: Dec. 7, 1999

[54] HEAT STABLE LAKED MONOAZO PIGMENT COMPOSITIONS

[75] Inventor: Amrit Pal Bindra, Brecksville, Ohio

[73] Assignee: Engelhard Corporation, Iselin, N.J.

[21] Appl. No.: 09/093,317

[22] Filed: Jun. 8, 1998

[51] Int. Cl.⁶ .......................... C09B 63/00; C09B 67/20
[52] U.S. Cl. .................. 106/496; 106/31.5; 524/92; 524/106; 524/190; 534/728; 534/780; 534/DIG. 4
[58] Field of Search .................. 106/496, 31.5; 534/780, 728, DIG. 4; 524/92, 106, 190

[56] References Cited

U.S. PATENT DOCUMENTS

| | | | |
|---|---|---|---|
| 4,594,411 | 6/1986 | Henning | 534/784 |
| 5,047,517 | 9/1991 | Deucker | 534/784 |
| 5,084,106 | 1/1992 | Kobayashi et al. | 106/496 |
| 5,457,188 | 10/1995 | Zimmermann | 106/496 |
| 5,744,590 | 4/1998 | Chorlton et al. | 106/496 |

FOREIGN PATENT DOCUMENTS

| | | | |
|---|---|---|---|
| 0126405A1 | 5/1984 | European Pat. Off. | C09B 29/50 |
| 0 225 553 | 6/1987 | European Pat. Off. | |
| 2616981A1 | 10/1977 | Germany | C09B 29/38 |
| 62-166359 | 7/1987 | Japan | G03G 9/08 |
| WO9622334 | 7/1996 | WIPO | C09B 63/00 |

Primary Examiner—Anthony Green

[57] ABSTRACT

Disclosed are red shade yellow compositions characterized by the formula:

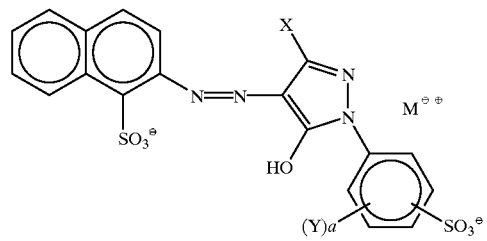

wherein X is a lower alkyl or a —$COOR_1$ group; wherein $R_1$ is a hydrogen or lower alkyl group; each Y is independently a lower alkyl, lower alkyloxy or halogen group; a is 0, 1, or 2; and M is a divalent metal. Also disclosed is a process for preparing red shade yellow pigment compositions prepared by initially a diazonium component comprised of one or more aromatic amines wherein at least one of said amines is a 1-sulfo-2-naphthylamine; and thereafter coupling the diazonium component with a coupling component comprised of a pyrazolone coupler to form a dye, and metallizing said dye with at least one divalent metal.

24 Claims, No Drawings

HEAT STABLE LAKED MONOAZO PIGMENT COMPOSITIONS

BACKGROUND OF THE INVENTION

1. Field of the Invention

This invention relates to novel laked azo pigments, processes for their preparation and to paint, plastic and ink compositions containing such pigments.

2. Description of Related Art

Metal salts of individual azo compounds containing a pyrazolone moiety containing two sulfo groups are known in the art as pigments.

For example, German Patent 2,616,981 describes metal salts of pyrazolone azo dyes which are obtained by coupling diazotized 2-amino-4, 5-dichlorobenzene-1-sulfonic acid with 1-(sulfoaryl)-3-methyl-5-pyrazolone compounds and subsequent laking with metal salts.

Japanese Patent 62,166,359 describes electrophotographic toners that contain monoazo pigments of the formula

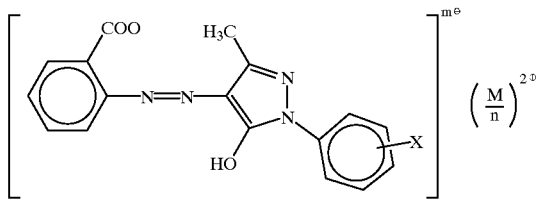

X=Cl or $SO_3^-$; m=1 or 2; M=Mg, Ca or Ba; n=1 or 2

When X is Cl, then m is 1 and n is 2, and when X is $SO_3^-$, then m is 2 and n is 1, U.S. Pat. No. 4,594,411 describes

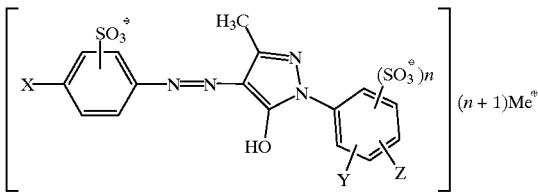

wherein R is $CH_3$ or $COO^-$; X is Cl, $CH_3$, $CH_3O$, $C_2H_5O$ $C_2H_5CONH$, $NH_2CONH$, $C_6H_5CONH$, $CH_3SO_2NH$, $CH_3CONH$, or hydrogen; Y is hydrogen, Cl, or $CH_3$; Z is hydrogen or Cl, n is 0, 1 or 2; $Me^+$ is one equivalent of a cation selected from the group consisting of $NH_4^+$, $Li^+$, $K^+$, $Na^+$, ½ $Sr^{2+}$, ½ $Mn^{2+}$, ½ $Ni^{2+}$, ½ $Ba^{2+}$, ½ $Mg^{2+}$ and ½ $Ca^{2+}$; with the provision that if R is $COO^-$, the additional equivalent charge is compensated by a further equivalent of said or another cation.

European Patent 0,126,405(German Patent 33,180,373) also describes laked pyrazolone azo pigments of the formula

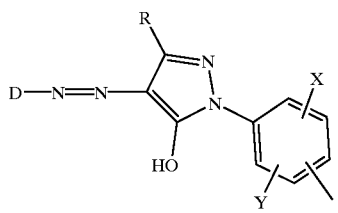

wherein D is tri or tetrasubstituted phenyl ring; R is $CH_3$ or $COO^-$; X is Cl, Br, $CH_3$, $CH_3O$, $C_2H_5O$ $CH_3CONH$, $SO_2NH_2$, $SO_3^-$; Y is Cl, Br, $CH_3$ or $SO_3^-$; Z is Cl, Br or $CH_3$.

U.S. Pat. No. 5,047,517 relates to a yellow monoazo pigment which is obtained by diazotization of 2-amino-4-chloro-5-methylbenzene-1-sulfonic acid, coupling of the diazonium compound with 1-(3'-sulfophenyl)-3-methyl-5-pyrazolone and subsequent laking of the coupling product to the calcium salt.

International Application WO 96/22334 describes an azo pyrazolone compound of formula

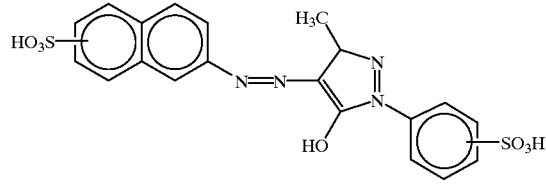

in the form of a salt and its use as a pigment.

There is a desire, however, to obtain pigments having redder shades of yellow with high heat stability and ease of preparation as well as reduced cost. There is a need for these yellow pigments to show improved performance in one or more of the following properties: color strength, resistance to polar solvents and lightfastness.

SUMMARY OF THE INVENTION

This invention relates to azo pigments suitable for use as coloring agents and processes for their preparation.

In one embodiment, this invention relates to red shade yellow compositions comprising one or more compounds characterized by the formula:

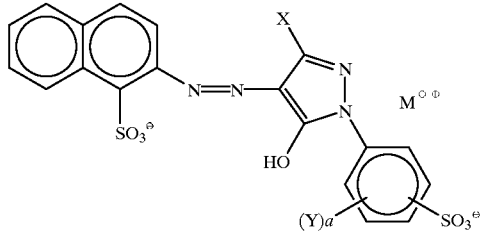

wherein X is a lower alkyl or a —COOR group; wherein R is hydrogen or lower alkyl group; each Y is independently a lower alkyl, lower alkyloxy or halogen group; a 0,1, or 2; and M is a divalent metal.

In another embodiment, this invention relates to a process for preparing an azo pigment which comprises forming a dye by coupling (i) a diazonium component comprised of one or more aromatic amines wherein at least one of said amines is a 1-sulfo-2-naphthylamine characterized by the formula:

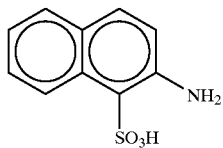

and salts thereof; with (ii) at least one coupling component characterized by the formula:

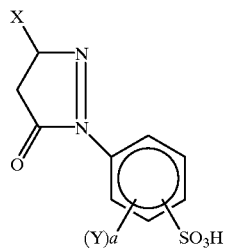

and salts thereof; wherein X is a lower alkyl or a —$COOR_1$ group; wherein $R_1$ is hydrogen or lower alkyl group; each Y is independently a lower alkyl, lower alkyloxy or halogen group; a is 0,1, or 2; and metallizing said dye with at least one divalent metal.

In one other embodiment, this invention relates to paint, plastic and ink compositions containing the azo pigment compositions of this invention.

DESCRIPTION OF THE PREFERRED EMBODIMENTS

As previously stated, this invention provides azo pigments and processes for their preparation. The pigments of the present invention may be prepared by initially diazotizing one or more aromatic amines wherein at least one of said amines is a 1-sulfo-2-naphthylamine; and thereafter coupling the diazonium component with a coupling component comprised of a pyrazolone coupler to form the desired dye.

The 1-sulfo-2-naphthylamines are characterized by the formula:

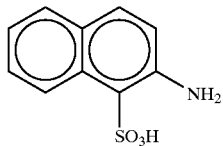

and salts thereof.

Mixtures of two or more of any 1-sulfo-2-naphthylamines are within the scope of this invention. Also within the scope of this invention are mixtures of one or more 1-sulfo-2-naphthylamines and one or more second amines, other than 1-sulfo-2-naphthylamines, selected from aromatic amines containing at least one acid group and salts thereof. Such second amines can be useful for shade adjustments of the pigments of this invention.

Examples of preferred salts include ammonium and the alkali metal salts such as the sodium and potassium salts.

A variety of suitable aromatic amines can be mixed with the 1-sulfo-2-naphthylamines for the purposes of the present invention. Almost any primary aromatic amine can be used where the aromatic moiety of such amine contains at least one substituent acid group or salts thereof, preferably alkali metal or ammonium salts (Ar). The aromatic amines may be monoamines or polyamines containing up to four or more amine groups per molecule. Thus, the diazonium components derived from such amine may contain one diazonium group (mono-diazonium), two diazonium groups (bis-diazonium), three diazonium groups (tris-diazonium), etc. The aromatic amines may be monocyclic amines such as aniline and its derivatives, or bicyclic amines such as naphthyl amine. The aromatic amines may also be biphenylamines or polyamines such as aminobiphenyl, benzidine, and 3, 3', 4, 4'-biphenyltetramine.

In one embodiment, the aromatic amine is a primary aromatic amine characterized by the formula (Formula I)

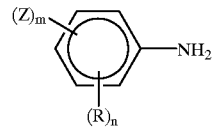

wherein each R is independently a halogen, hydrocarbyl, hydrocarbyloxy, carboxylic acid ester, sulfonic acid ester, carboxylic acid amide, imidazolone, sulfonic acid amide or nitro group; n is 0, 1 or 2; each Z is independently a —COOH or —$SO_3H$ group, or salts of such groups; m is 1 or 2; wherein it is understood that the imidazalone group is represented by the formula —NH—C—NH— which, when taken together with the aromatic ring, the nitrogen atoms are bonded to adjacent carbons to form a five member ring. The term "hydrocarbyl" as used in this specification and claims is intended to include hydrocarbons which may contain substituent groups such as ether, ester, nitro or halogen which do not materially affect the hydrocarbon character of the group.

The aromatic amines characterized by Formula I may contain 0, 1 or 2 R groups which are each independently a halogen, hydrocarbyl, hydrocarbyloxy, carboxylic acid ester, sulfonic acid ester, carboxylic acid amide, imidazolone, sulfonic acid amide or nitro group. The halogen group can be any of the halogens, although chlorine and bromine are generally used, with chlorine being the most preferred example of a halogen substituent. The hydrocarbyl groups may independently be alkyl, cycloalkyl, aryl, aralkyl or alkaryl groups. For example, if R is an unsubstituted aryl group, the aromatic amine is a biphenyl amine. When R is an alkyl group, the alkyl group generally will contain from one to four carbon atoms. As used herein, "lower alkyl" shall mean those alkyl groups containing from 1 up to 4 carbon atoms. When R is a hydrocarbyloxy group, the hydrocarbyl moiety may be any of the hydrocarbyl groups discussed above although the hydrocarbyloxy group generally is an alkoxy group containing from 1 to about 4 or more carbon atoms. Preferred R groups are methyl, ethyl and chloro groups.

The aromatic amines characterized by Formula I also contain one or two acid groups of —COOH and —$SO_3H$, or salts thereof. In one embodiment, the aromatic amine of Formula I contains an —$SO_3H$ group.

Examples of aromatic amines characterized by Formula I wherein Z is a sulfonic acid group and m is 1 include 2-aminobenzene-1-sulfonic acid, 4-aminobenzene-1-sulfonic acid, 2-amino-5-methylbenzene-1-sulfonic acid, 2-amino-5-methoxybenzene-1-sulfonic acid, 3-amino-6-methylbenzene-1-sulfonic acid, 2-amino-4-chloro-5-methylbenzene-1-sulfonic acid, 2-amino-5-chloro-4-ethylbenzene-1-sulfonic acid, 2-amino-5-chloro-4-methylbenzene-1-sulfonic acid, etc.

Examples of aromatic amines characterized by Formula I wherein Z is a carboxylic acid group, and m is 1 include 2-aminobenzoic acid, 3-aminobenzoic acid, 4-aminobenzoic acid, 2-amino-5-methylbenzoic acid, 2-amino-6-methylbenzoic acid, 3-amino-2-methylbenzoic acid, 2-amino-3-methoxybenzoic acid, 4-amino-3-methoxybenzoic acid, 4-amino-5-chloro-2-methoxybenzoic acid, 2-amino-4-chlorobenzoic acid, 3-amino-4-chlorobenzoic acid, etc. The benzene sulfonic acid and benzoic acid compounds can be used per se or as their salts. Examples of preferred salts include the alkali metal salts such as the sodium and potassium salts.

The aromatic amines from which the diazonium components are prepared may be fused cyclic aromatic amine compounds such as compounds derived from various naphthalenes other than 1-sulfo-2-naphthylamines including, 4-aminonaphthalene-1-sulfonic acid, etc. Examples of aromatic amines which are biphenyl amines and polyamines include 4-aminobiphenyl-3'-sulfonic acid, and 4,4'-diaminobiphenyl-2,2'-disulfonic acid.

The diazotization of the amines useful for the purposes of this invention may be carried out in the manners known to those skilled in the art through the use of alkali metal nitrites or lower alkyl nitrites together with an adequately strong acid such as a mineral acid. Examples of useful mineral acid include hydrochloric acid and sulfuric acid. Nitrosyl sulfuric acid also can be utilized. The diazotization reaction can be conducted at a temperature in the range of from about −20 to +30° C., preferably from 0 to 20° C. Although not required, it may be advantageous in some of the diazotization reactions (and in the subsequent coupling reactions) to include a surface-active agent such as a non-ionic, anionic or cationic surface active agent and, optionally, appropriate organic solvents such as, for example, glacial acetic acid, lower alkanols, dioxane, formamide, dimethyl formamide, dimethyl sulfoxide, pyridine or N-methyl pyrrolidone.

The pyrazolone couplers useful for the purposes of this invention are represented by the formula:

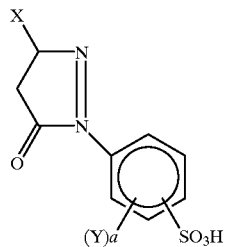

and salts thereof, wherein X is a lower alkyl or a —COOR$_1$ group; wherein R$_1$ is hydrogen or lower alkyl group; each Y is independently a lower alkyl, lower alkyloxy or halogen group; a is 0, 1, or 2.

Preferably, the pyrazolone couplers useful for the purposes of this invention are characterized by the formula:

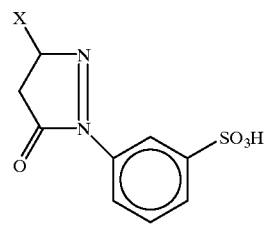

wherein X is a methyl, ethyl, —COOH, —COOCH$_3$, —COOCH$_2$CH$_3$, more preferably,

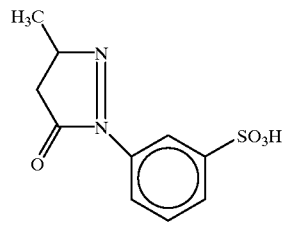

Mixtures of two or more of any of the pyrazolone components are within the scope of this invention.

The coupling reaction useful for the purposes of the present invention may be effected preferably by adding the diazonium components to coupling components, but the coupling components can be added to the diazonium components. Coupling is generally effected at a temperature of from about −20 to about 80° C., preferably from about 20 to about 65° C. As in a diazotization reaction, coupling may be carried out in the presence of an appropriate surface active agent or organic solvent, such as all of those identified above for the diazotization reaction.

In one embodiment, the coupling component is dissolved in a basic solution such as an aqueous alkali metal hydroxide solution and reprecipitated with a dilute acid such as acetic acid.

In another embodiment, generally, the diazonium component is coupled with a slight stoichiometric excess of the coupling component. That is, one equivalent of the diazonium component is coupled with slightly more than one equivalent of the coupling component.

In another embodiment of the present invention, the dispersibility of the pigments of the present invention can be improved by adding alkali-soluble resin-like products before, during, or after the coupling is completed or after the metallization discussed below. Various resin-like materials can be added for this purpose, and these include for example, rosin resins, polymeric rosins, resin soap, chemically modified rosin resins such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulphates and carbonates, titanium dioxide or clay materials or very finely divided organic plastic materials.

The composition prepared by the above-described coupling reaction can be metallized by a divalent metal salt which forms the sulfonate salt. This is also known as laking and forms the azo pigment. The metal salt may be a salt of alkaline earth metals, manganese, nickel or zinc or mixtures of two or more of these metals.

Alkaline earth metal salts are preferred. Alkaline earth metal salts such as SrCl$_2$ and CaCl$_2$ are particularly useful for this purpose. Metallization may be accomplished preferably by adding the metal salt to the dye after coupling all of the diazonium component present is complete or, by including the metal salt in the diazonium component whereby metallization occurs as the dye is formed.

In most applications, it is desirable, in order to achieve the full brightness and tinctorial strength, to heat the azo pigment. For example, the product of the metallization may be heated to reflux temperature for about 1 to 3 hours or at temperatures above 100° C. under pressure in the presence of the above-described resin soaps or other soluble resins.

After completion of the metallization, the azo pigments are recovered from the water-based reaction slurry by filtering to form a presscake of pigment which is washed with hot (e.g., 40–60° C.) water so as to remove the excess acids, bases and salts formed in the coupling reaction. The presscake is typically washed with from about 10 to 20 times its volume of hot water. The filter cake is generally washed until the filtrate gives only a slightly positive test for chloride ion. The washed presscakes can be dried, ground and used in the form of a coarse or finely divided powder. Alternatively, the azo pigments of this invention can be dispersed into oleoresinous vehicles to prepare flushed bases or dispersed into aqueous vehicles to prepare aqueous dispersions.

The pigment compositions of this invention provide red shade yellow pigments having improved color strength, resistance to polar solvent, light fastness and/or heat stability and are useful as coloring agents in plastics, paints and inks.

This invention, therefore, also relates to paint, ink and plastic compositions comprising major amounts of a paint vehicle, ink vehicle or plastic and minor amounts of the compositions of this invention.

The paint, ink and plastic compositions in which the compositions of this invention are useful are well known to those of ordinary skill in the art. Examples of inks include printing inks and lacquers, and plastics include thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile. It is also useful for pigment printing and for the pigmenting of paper in the mass.

Due to its excellent heat resistance, the pigment is in particular suitable for the pigmenting of plastics in the mass, such as, for example, of polystyrene and its mixed polymers, polyolefins, in particular polyethylene and polypropylene and the corresponding mixed polymers, polyvinyl chloride and polyesters in particular polyethylene glycol terephthalate and polybutylene terephthalate and the corresponding mixed condensation products based on polyesters.

See, for example, with regard to ink: R. H. Leach, editor, *The Printing Ink Manual,* Fourth Edition, Van Nostrand Reinhold (International) Co. Ltd., London (1988), particularly pages 282–591; with regard to paints: C. H. Hare, Protective Coatings,Technology Publishing Co., Pittsburgh (1994), particularly pages 63–288; and with regard to plastics: T. G. Webber, *Coloring of Plastics,* John Wiley & Sons, New York (1979), particularly pages 79–204. The foregoing references are hereby incorporated by reference herein for their teachings of ink, paint and plastic compositions, formulations and vehicles in which the compositions of this invention may be used including amounts of colorants.

The following examples illustrate the compositions of the present invention and their methods of preparation. Unless otherwise indicated in the following examples and elsewhere in the specification and claims, all parts and percentages are by weight, temperatures are in degrees centigrade and pressures are at or near atmospheric.

EXAMPLE 1

2-aminonaphthalene-1-sulfonic acid (13.1 parts) are dissolved in 300 parts of water and 2.5 parts of sodium hydroxide by stirring at 40–45° C. The solution is cooled to 0° C. by the addition of ice and diazotized by the addition of 4 parts sodium nitrite in 12 parts of water followed by addition of 17.5 parts 20 Baume hydrochloric acid and stirring the solution at 0–10° C. for 30 minutes. Excess nitrous acid is then quenched by the addition of sulfamic acid. The slurry is chilled to 0° C. by addition of ice. A solution of 6 parts of calcium chloride dihydrate in 14 of water is then added to the slurry.

Sixteen parts of 1-(3'-sulfophenyl)-3-methyl-5-pyrazolone are dissolved in 500 parts of water and 2.5 parts of sodium hydroxide and the temperature is adjusted to 20° C., pH is adjusted to 6.5 and the diazonium slurry is then slowly added to it while maintaining the pH at 6–7 through addition of sodium hydroxide. The mixture is then stirred for approximately twenty minutes to complete the coupling. Calcium chloride dihydrate (30 parts) in 70 parts of water are added. Volume is then adjusted to 1,800 ml and the pH is adjusted to 4.5. The slurry is then heated to boil. After boiling for 60–90 minutes, the slurry is iced to lower than 40° C. and filtered; the filtercake is washed with water, dried overnight at 70° C. and pulverized to give a reddish yellow pigment powder.

COMPARATIVE EXAMPLE 1

The sodium salt of 1-naphthylamine-4-sulfonic acid (8.9 parts) and 100 parts of water are stirred together with the addition of sufficient 50% sodium hydroxide solution to form a solution alkaline to Brilliant Yellow paper. The solution is placed in an ice bath and cooled to 0–5° C. and 15 parts of 20 Baume hydrochloric acid are added. A solution of 3.13 parts of sodium nitrite in 9.4 parts of water is added and the mixture is stirred at 0–5° C. for 30 minutes. Excess nitrous acid is then quenched by the addition of sulfamic acid. The slurry is chilled to 0° C. by addition of ice.

Dissolved in 200 parts of water are 13.2 parts of 1-(3'-sulfophenyl)-3-methyl-5-pyrazolone and 2.5 parts of sodium hydroxide. The temperature of this solution is adjusted to 5° C. pH is adjusted to 6.5 and the diazonium slurry is then slowly added to it while maintaining the pH at 6–7 through the addition of sodium hydroxide. The pH of the slurry is adjusted to 6.5 and the mixture is stirred overnight at room temperature. The reaction mixture is then heated to 90° C. and a solution of 48 parts of calcium chloride dihydrate in 112 parts of water is added. The mixture is then stirred further for a 3 hours at 90° C., cooled to 55° C. and filtered. The filtercake is washed with water, dried overnight at 70° C. and pulverized to give an orange pigment powder.

COMPARATIVE EXAMPLE 1A

The procedure of Comparative Example 1 is repeated, except that instead of 1-naphthylamine-4-sulfonic acid sodium salt, 8.9 parts of 1-naphthylamine-6-sulfonic acid An orange pigment powder is obtained.

EXAMPLE 2

The procedure of Example 1 is repeated, except that instead of the addition of calcium chloride, 5.7 parts of strontium nitrate in 17.5 parts of water are added to the diazonium slurry and 21 parts of strontium nitrate in 49 parts of water are added after coupling instead of the addition of calcium chloride. A yellowish orange pigment powder is obtained.

COMPARATIVE EXAMPLE 2

The procedure of Comparative Example 1 is repeated, except that instead of the addition of calcium chloride, 48 parts of strontium nitrate in 112 parts of water are added. An orange pigment powder is obtained.

COMPARATIVE EXAMPLE 2A

The procedure of Comparative Example 1A is repeated, except that instead of the addition of calcium chloride, 48 parts of strontium nitrate in 1 12 parts of water are added. An orange pigment powder is obtained.

EXAMPLE 3

The procedure of Example 1 is repeated, except that instead of the addition of calcium chloride, 8 parts of manganese sulfate hydrate are added to the diazonium slurry and 18 parts of manganese sulfate hydrate are added after coupling instead of the addition of calcium chloride. A yellowish orange pigment powder is obtained.

TEST METHOD

A mixture of 0.5 part pigment, 0.5 part titanium dioxide (DuPont Ti-Pure R-960) and 500 parts high density polyethylene (Solvay T50-2000-G) is shaken on a paint shaker to uniformity, then injection molded at 232° C. in a 30 ton Battenfield machine. Spectrophotometric values are measured with a Macbeth Color-Eye (specular component included, large area) to give the apparent strength and hue angle under Illuminant D, 10°, shown in the Table I.

TABLE I

Results from Test Method

| Pigment | Chromaticity Value | Hue Angle | Apparent Strength (K/S) |
|---|---|---|---|
| Example 1 | 73.0 | 66.3° | 23.1 (Standard) |
| Comparative Example 1 | 32.4 | 45.4° | 4.9 (79% Weak) |
| Comparative Example 1A | 59.7 | 52.6° | 17.5 (24% Weak) |
| Example 2 | 78.2 | 70.3° | 26.8 (Standard) |
| Comparative Example 2 | 37.6 | 43.7° | 6.3 (77% Weak) |
| Comparative Example 2A | 60.4 | 49.9° | 20.3 (24% Weak) |

When incorporated in polyolefins, the pigments obtained according to the present invention display strong, bright reddish shade yellows in contrast to the weak orange to reddish orange shades displayed by pigments derived from 1-naphthylamine-4-sulfonic acid and 1-naphthylamine-6-sulfonic acid. The calcium salt of the dye obtained by coupling diazotized 2-amino naphthalene-1-sulfonic acid with 1-(3'-sulfophenyl)-3-methyl-5-pyrazolone (Example 1) displays a strong, bright reddish yellow color (hue angle 66.3). The high chromaticity value (73.0) is consistent with the brightness of the color displayed while the high strength is reflected by a high K/S value of 23.1. In contrast, the corresponding pigment obtained by using 1-naphthylamine-4-sulfonic acid in place of 2-aminonaphthalene-1-sulfonic acid (Comparative Example 1) shows a very weak and dull reddish orange color (hue angle 45.4) of low chromaticity (32.4) and very low strength (K/S value of only 4.9). The corresponding pigment obtained by using 1-naphthylamine-6-sulfonic acid (Comparative Example 1A) also displays a weak orange color (hue angle 59.7) of low chromaticity (52.6) and low strength (K/S value of 17.8). Similarly, the strontium salt of the dye obtained by coupling diazotized 2-amino naphthalene-1-sulfonic acid with 1-(3'-sulfophenyl)-3-methyl-5-pyrazolone (Example 2) displays a strong, bright reddish yellow color (hue angle 70.3). The high chromaticity value (78.2) is consistent with the brightness of the color displayed and the high strength is reflected by a high K/S value of 26.8. In contrast, the corresponding pigment obtained by using 1-naphthylamine-4-sulfonic acid in place of 2-aminonaphthalene-1-sulfonic acid (Comparative Example 2) shows a very weak and dull reddish orange color (hue angle 43.7) of low chromaticity (37.6) and very low strength (K/S value of only 6.3). The pigment obtained by using 1-naphthylamine-6-sulfonic acid (Comparative Example 2A) displays a weak orange color (hue angle 49.9) of low chromaticity (60.4) and relatively low strength (K/s value of 20.3).

What is claimed is:

1. A red shade yellow pigment composition comprising one or more compounds having the formula:

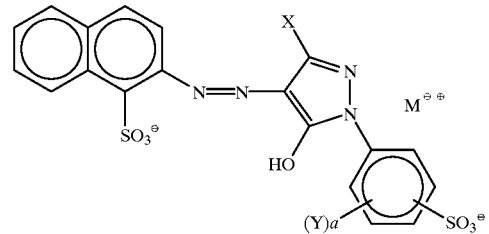

wherein X is a lower alkyl group containing 1 to 4 carbon atoms or a —COOR$_1$ group; wherein R$_1$ is a hydrogen or lower alkyl group containing 1 to 4 carbon atoms; each Y is independently a lower alkyl group containing 1 to 4 carbon atoms, lower alkyloxy group containing 1 to about 4 carbon atoms or halogen group; a is 0, 1, or 2; and M is a divalent metal.

2. A composition according to claim 1 wherein X is a methyl or ethyl group.

3. A composition according to claim 1 wherein each Y is independently a methyl or chloro group; and a is 0 or 1.

4. A composition according to claim 3 wherein X is a methyl group and a is 0.

5. A composition according to claim 1 wherein M is an alkaline earth metal, manganese, nickel or zinc.

6. A composition according to claim 4 wherein M is calcium, strontium, barium or mixtures thereof.

7. A red shade yellow pigment composition comprising one or more compounds having the formula:

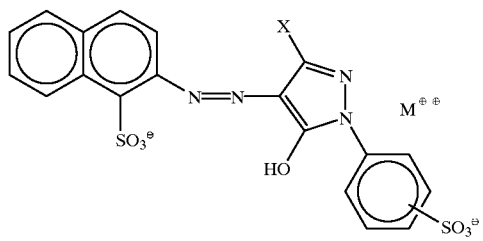

wherein X is a lower alkyl group containing 1 to 4 carbon atoms; and M is a divalent metal.

8. A composition according to claim 7 wherein M is a divalent metal selected from the group consisting of alkaline earth metals, manganese, nickel and zinc.

9. A composition according to claim 7 wherein X is a methyl or ethyl group.

10. A composition according to claim 7 wherein M is calcium, strontium, barium or mixtures thereof.

11. A process for preparing a red shade yellow pigment composition which comprises making an azo dye by coupling (i) a diazonium component comprised of one or more aromatic amines wherein at least one of said amines is a 1-sulfo-2-naphthylamine having the formula:

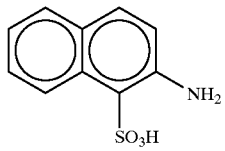

and salts thereof; with (ii) at least one coupling component having the formula:

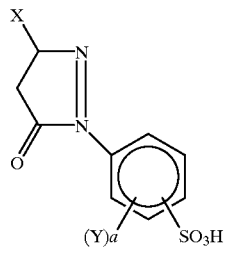

and salts thereof; wherein X is a lower alkyl group containing 1 to 4 carbon atoms or a —COOR$_1$ group; wherein R$_1$ is a hydrogen or lower alkyl group containing 1 to 4 carbon atoms; each Y is independently a lower alkyl group containing 1 to 4 carbon atoms, lower alkyloxy group containing 1 to about 4 carbon atoms or halogen group; a is 0, 1, or 2; and M is a divalent metal.

12. A process according to claim 11 wherein X is a methyl or ethyl group.

13. A process according to claim 11 wherein each Y is independently a methyl or chloro group; and a is 0, or 1.

14. A process according to claim 13 wherein X is a methyl group and a is 0.

15. A process according to claim 11 wherein M is an alkaline earth metal, manganese, nickel or zinc.

16. A process according to claim 15 wherein M is calcium, strontium, barium or mixtures thereof.

17. A composition prepared according to the process of claim 11.

18. A composition prepared according to the process of claim 16.

19. A paint composition comprising a major amount of a paint vehicle and a minor amount of the composition of claim 1.

20. A paint composition comprising a major amount of a paint vehicle and a minor amount of the composition of claim 17.

21. An ink composition comprising a major amount of an ink vehicle and a minor amount of the composition of claim 1.

22. An ink composition comprising a major amount of an ink vehicle and a minor amount of the composition of claim 17.

23. A plastic composition comprising a major amount of a plastic material and a minor amount of the composition of claim 1.

24. A plastic composition comprising a major amount of a plastic material and a minor amount of the composition of claim 17.

* * * * *